(12) United States Patent
Naaktgeboren

(10) Patent No.: US 7,669,400 B2
(45) Date of Patent: Mar. 2, 2010

(54) ROTOR REVERSING MECHANISM

(75) Inventor: Adrianus Naaktgeboren, Varsenare (BE)

(73) Assignee: CNH America LLC, New Holland, PA (US)

( * ) Notice: Subject to any disclaimer, the term of this patent is extended or adjusted under 35 U.S.C. 154(b) by 354 days.

(21) Appl. No.: 11/787,277

(22) Filed: Apr. 16, 2007

(65) Prior Publication Data

US 2007/0240398 A1    Oct. 18, 2007

(30) Foreign Application Priority Data

Apr. 18, 2006  (GB)  ................... 0607557.6

(51) Int. Cl.
*A01D 43/02* (2006.01)
*B21F 9/00* (2006.01)

(52) U.S. Cl. ........................ 56/341; 254/213
(58) Field of Classification Search ......... 254/213–223; 56/11.2, 341
See application file for complete search history.

(56) References Cited

U.S. PATENT DOCUMENTS

| 3,608,557 | A | * | 9/1971 | Evans .......................... 460/103 |
| 4,296,596 | A | * | 10/1981 | Waldrop et al. ................ 56/341 |
| RE32,599 | E | * | 2/1988 | Musser et al. ................. 56/11.2 |
| 6,164,050 | A | * | 12/2000 | Vande et al. ................... 56/341 |
| 6,644,006 | B1 | | 11/2003 | Merritt et al. |
| 6,681,552 | B2 | * | 1/2004 | Nelson et al. ................. 56/11.2 |
| 6,925,788 | B2 | * | 8/2005 | Nelson et al. ................. 56/11.2 |

FOREIGN PATENT DOCUMENTS

| DE | 19534138 | 10/1996 |
| DE | 20005965 | 8/2000 |
| EP | 0139264 A1 | 5/1985 |
| EP | 1228682 | 8/2002 |

\* cited by examiner

*Primary Examiner*—Evan H Langdon
(74) *Attorney, Agent, or Firm*—Patrick M. Sheldrake; John William Stader; Michael G. Harms

(57) ABSTRACT

A rotor reversing mechanism for a baler comprises a ratchet 12 mounted for rotation with the rotor, a pawl 22 carried by a reversing arm 16 for engaging the ratchet 12, a double acting hydraulic cylinder 32 for reciprocating the reversing arm 16 to cause the rotor to rotate in a reverse direction and means for disengaging the pawl 22 from the ratchet when the reversing arm is in a park position. In the invention, a spring 40 is provided for urging the reversing arm 16 towards the park position and the working chambers of the double acting hydraulic cylinder 32 are permanently connected to one another by way of a throttled passage 74.

8 Claims, 4 Drawing Sheets

2

ROTOR REVERSING MECHANISM

FIELD OF THE INVENTION

The present invention relates to a rotor reversing mechanism for a baler and can be used with both round and square balers or any other rotor type in-feed system.

BACKGROUND OF THE INVENTION

The rotor of a baler is the part used to propel the straw picked up from the ground into the baling chamber of a baler where it is compacted and formed into bales. The rotor can also be part of an in-feed or transport element for other processing means. In use, a blockage of the rotor may occur from time to time resulting in activation of the overload safety device in the drive line. Hence the drive is interrupted and, in such an event, the operator has to switch off the drive to the baler and rotate the rotor in the reverse sense to release the blockage.

For this purpose, it is known to provide a baler rotor with a reversing mechanism which comprises a ratchet mounted on the rotor and a pawl carried by on a reversing arm that is reciprocated by means of a double acting hydraulic cylinder. When the reversing arm is extended fully into a park position, the pawl is disengaged from the ratchet to allow the rotor to rotate in its normal forward direction.

A problem that arises when using such a reversing mechanism is that the operator can accidentally re-engage the drive to the baler before the reversing arm has reached its park position, that is to say while forward rotation of the rotor is being opposed by engagement between the pawl and the ratchet. Such premature re-engagement of the drive to the baler can result in serious and possibly irreparable damage to the reversing mechanism.

SUMMARY OF THE INVENTION

With a view to mitigating the foregoing disadvantage of the prior art, the present invention provides a reversing mechanism for a baler rotor which comprises a ratchet mounted for rotation with the rotor, a pawl carried by a reversing arm for engaging the ratchet, a double acting hydraulic cylinder for reciprocating the reversing arm to cause the rotor to rotate in a reverse direction and means for disengaging the pawl from the ratchet when the reversing arm is in a park position, characterized in that a spring is provided for urging the reversing arm towards the park position and the working chambers of the double acting hydraulic cylinder are permanently connected to one another by way of a throttled passage.

In a baler intended to be towed by a tractor, the hydraulic supply to the double acting hydraulic cylinder is normally derived from a four port three position valve on the tractor. The ports include two input ports and two output ports. The input ports are connected to a high pressure and a drain, respectively, while the two output ports lead to the working chambers on the opposite sides of the piston of the hydraulic cylinder. In a neutral central position of the valve, all the ports are isolated. In a first end position of the valve, the high pressure input port is connected to a first of the working chambers and the drain is connected to the second. Last, in the opposite end position of the valve, the connections to the working chambers are reversed, that is to say the first working chamber is connected to drain while the second is connected to the high pressure input port.

In the present invention, as in the prior art, moving the valve to one end position results in the rotor being cranked in a reverse direction and moving the valve to the opposite end position returns the reversing arm towards the park position.

The reversing mechanism of the invention, however, differs from the prior art in its operation when the valve is in the neutral position. In the prior art, both of the working chambers of the double acting hydraulic cylinder were blocked and hydraulic fluid could not flow into or out of either working chamber. As a result, the position of the reversing arm was hydraulically locked. Consequently, if the neutral position was engaged before the reversing arm had reached its park position, the pawl would still be engaged with ratchet and re-engaging the drive to the rotor would result in damage to the reversing mechanism, as earlier mentioned. By contrast, in the present invention, in the neutral position of the valve, the two working chambers of the double acting cylinder are connected to one another through the throttled passage. Consequently, there is no hydraulic lock and instead the spring acting on the reversing arm will move it to the park position where the pawl is disengaged and any fluid displaced from one of the working chambers during this movement will simply be pumped into the other through the throttled passage.

The passage connecting the two working chambers creates a short circuit in parallel with the hydraulic cylinder. The degree of throttling provided in the passage is necessarily a compromise in that the greater the throttling the higher the pressure developed across the passage to operate the hydraulic cylinder. On the other hand, as the throttling also acts to damp the movement of the reversing arm towards the park position, reducing the degree of throttling enables the reversing arm to return to the park position more quickly.

The faces of the piston of the double acting cylinder may have an equal surface area but this makes for a more expensive construction of the cylinder. More usually, because the piston rod projects from only one end of the cylinder, the piston faces are of unequal area and the piston acts as a differential piston.

In the preferred embodiment of the invention, the piston is a differential piston and the pressure acting on the larger face of the piston acts to move the reversing arm towards the park position. In this case, the volume of fluid discharged from the working chamber with the smaller cross sectional area is always less than the volume available in the chamber on the opposite side of the piston to accommodate the discharge fluid. Consequently, the risk of hydraulic lock does not arise, though a void (filled with a Torricellian vacuum) will be developed in the working chamber with the larger cross sectional area.

The use of a differential piston also affects the speed of movement of the reversing arm, causing it to move more rapidly towards the park position than away from the park position. This is advantageous in that it reduces the risk of the drive to the rotor being re-engaged before the pawl has been disengaged from the ratchet.

The reversing arm is preferably mounted for rotation about the axis of the rotor and the pawl is pivotably mounted on the reversing arm in such a manner as to engage with the ratchet teeth under the action of a spring, the pawl being pivoted against the action of the spring when it comes into a contact with a stationary abutment in the park position of the reversing arm.

Though the spring may act directly on the reversing arm, it is preferred for the spring to act on the reversing arm by way of a lever system designed to increase the spring force acting on the reversing arm as it approaches the park position.

The spring lever system may conveniently comprise a first lever rotatable at one end about an axis that is fixed in relation to the rotor axis and carrying at its opposite end a two-armed lever, one arm of the two-armed lever being connected to the reversing arm and the other to a spring of which the opposite end is anchored to a point that is fixed relative to the axis of the rotor.

Advantageously, the two-armed lever is a bell crank lever and the anchoring point of the spring coincides with the pivot axis of the first lever.

BRIEF DESCRIPTION OF THE DRAWINGS

The invention will now be described further, by way of example, with reference to the accompanying drawings, in which:

FIG. 4 is a section through a detail of the reversing mechanism of FIG. 1.

DETAILED DESCRIPTION OF THE PREFERRED EMBODIMENT

Figure 1:
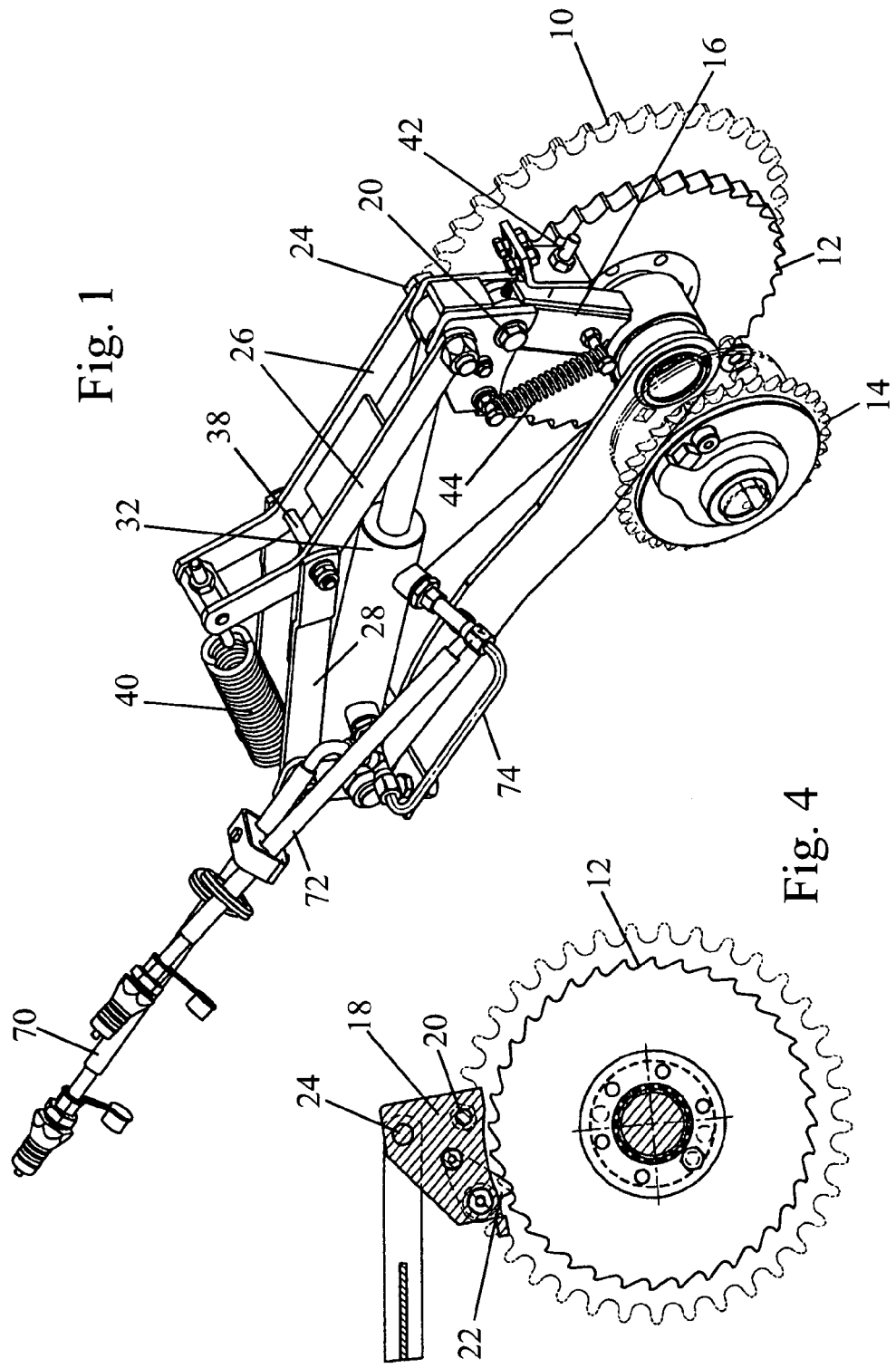
FIG. 1 is a perspective view of a reversing mechanism of the invention.

In the drawings, the sprocket 10 is used to drive the rotor of a baler, the rotor not being shown in the drawings. A ratchet 12 is mounted on the same axis for rotation with the rotor as is a second sprocket 14 which is used to transmit drive to a pickup. As earlier explained, blockages develop from time to time within the baler and these are freed by rotating the rotor in the reverse direction.

The present invention is concerned only with the reversing mechanism and only the parts concerned with driving the rotor in the reverse direction will now be described in detail.

The reversing mechanism comprises a reversing arm 16 rotatable about the axis of the rotor and carrying a head 18 which is shown in section in FIG. 4. The head 18 can pivot relative to the reversing arm 16 about a pivot bolt 20 and it carries a pawl 22 which engages the teeth of the ratchet 12. At a point 24 above the pivot 20, the head 18 is pivotably connected to the end of the rod 30 of a double acting hydraulic jack 32 of which the cylinder is pivotably mounted about a fixed pivot bolt 34.

Figure 2:
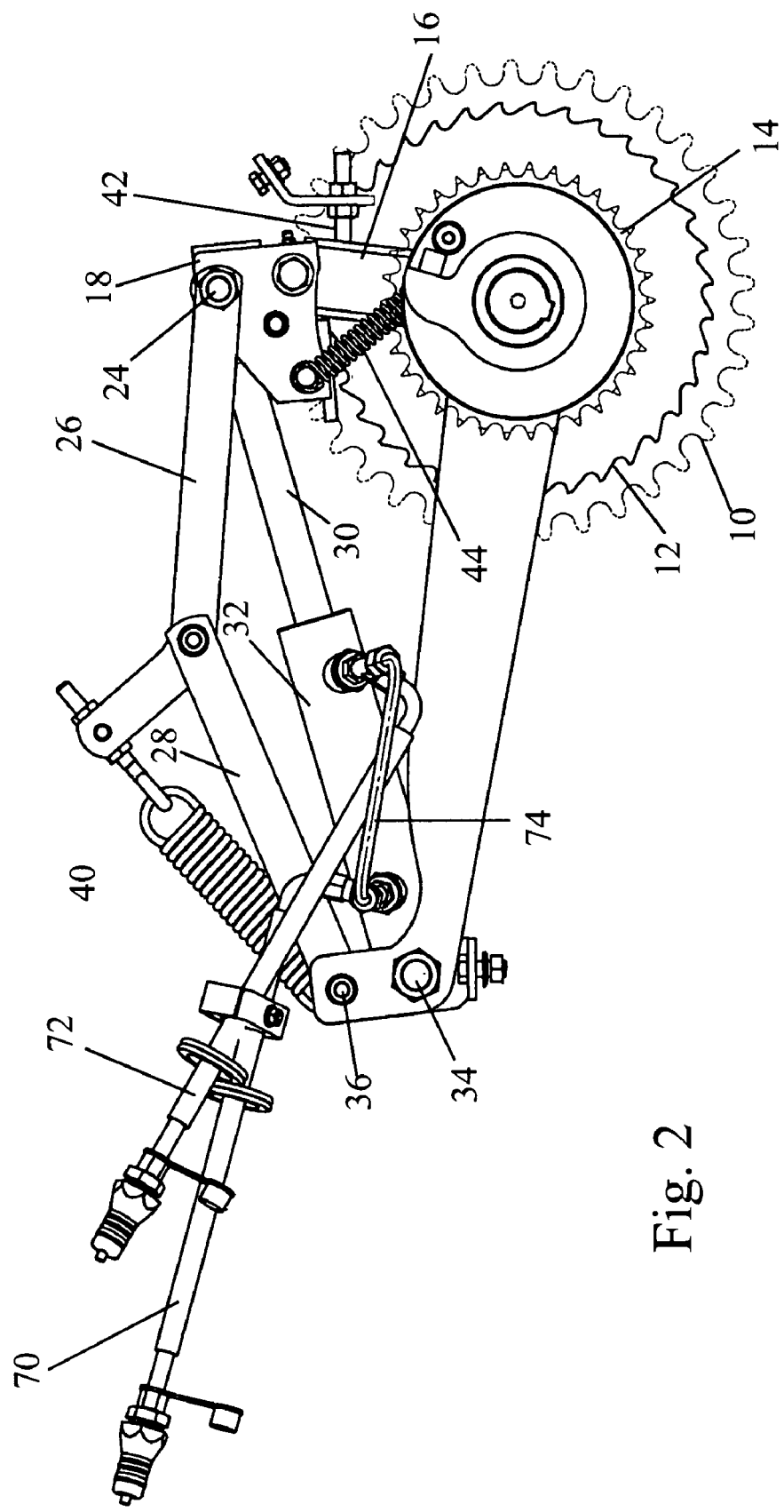
FIG. 2 is a front view of the mechanism shown in FIG. 1.
Figure 3:
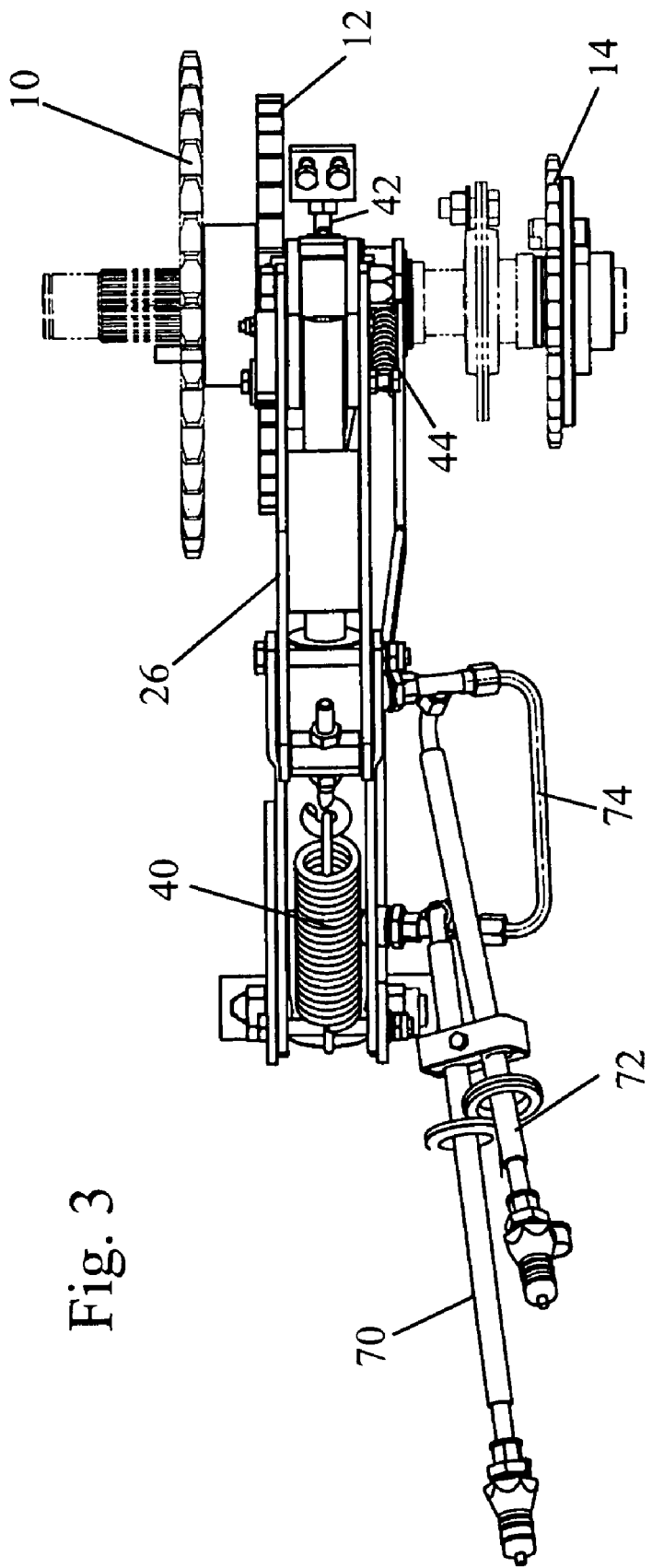
FIG. 3 is a plan view from above of the mechanism shown in FIG. 1.

When the rotor is to be reversed for the purpose of clearing a blockage, the rod 30 of the hydraulic jack 32 is retracted from the park position shown in FIG. 2. Pulling on the pivot point 24 causes the head 18 to pivot about the bolt 20 so that the pawl 22 engages in the teeth of the ratchet 12. This locks the reversing arm 18 to the rotor and as the rod 30 is retracted the rotor is caused to rotate in the reverse direction. To continue to turn the rotor after the rod of 30 has reached the limits of its stroke, the rod 30 is first extended towards the illustrated position in FIG. 2. While doing so, the pawl 22 will ride over the teeth of the ratchet 12 against the action of a spring 44 which biases the pawl 22 in a direction to engage with the ratchet teeth. Several cycles of operation of the hydraulic jack 32 may be carried out until the rotor has been turned sufficiently for the blockage to be cleared.

Once the blockage has been cleared, it is essential to ensure that the pawl 22 has been disengaged from the teeth of the ratchet 12 before the drive to the rotor through the sprocket 10 is re-engaged. This is effected by extending the rod 30 to the position shown in FIG. 2 in which the reversing arm 16 abuts an adjustable stop 42. Further extension of the rod 30 will now cause the head 18 to pivot clockwise, as viewed, about the bolt 20 and thereby disengage the pawl 22 from the teeth of the ratchet 12. This is the position which is referred to herein as the park position.

As so far described the reversing mechanism and its method of operation are conventional. The problem that was encountered in the prior art was that the drive to the rotor could be engaged while the pawl 22 was still engaged with the teeth of the ratchet 12 with consequent damage to the reversing mechanism.

In the illustrated embodiment of the invention, the head 18 of the reversing arm is additionally pivotably connected at the point 24 to a spring biased lever system that urges the reversing arm 16 towards the park position. The lever system comprises a bell crank lever 26 which is itself pivoted at a central fulcrum 38 about the free end of a lever 28. The lever 28 is pivoted about a fixed axis 36 located near the pivot bolt 34. The end of one arm of the bell crank lever 26 is pivotably connected to the point 24 on the head 18 of the reversing arm 16 while the free end of the other arm of the bell crank lever 28 is connected by way of a coil spring 40 to the pivot 36 of the lever 28.

Figure 5:
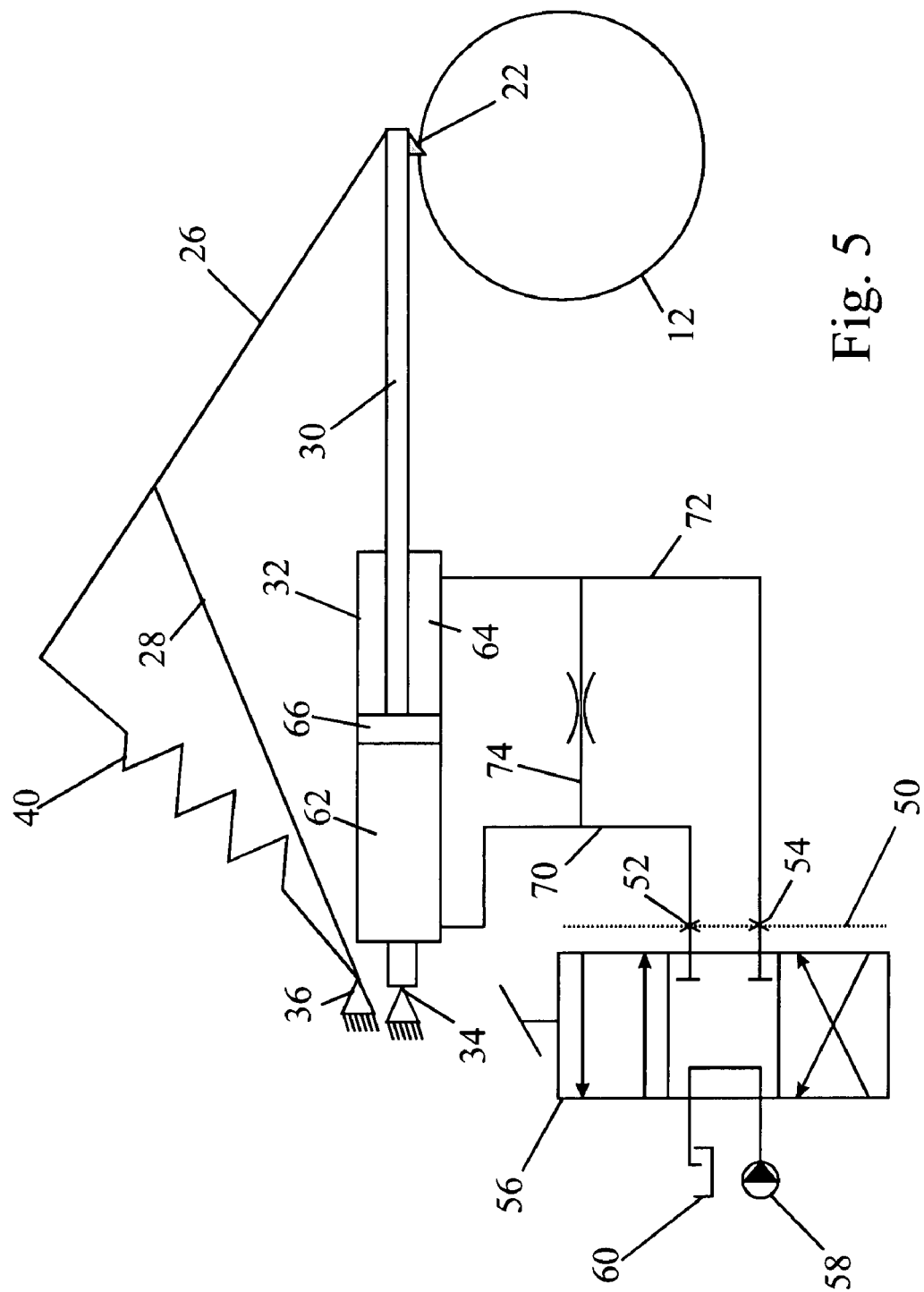
FIG. 5 is a schematic representation of the hydraulic circuit of the reversing mechanism in FIG. 1.

Furthermore the circuit of the hydraulic jack is modified in the manner illustrated in FIG. 5. In FIG. 5, the parts of the hydraulic circuit shown to the left of the dotted line 50 form part of the tractor towing the baler. Two connectors 52 and 54 lead to a manually controlled three position valve 56. Two ports on the input side of the valve 56 are connected to a hydraulic pump 58 and a reservoir 60, respectively. In the central position of the valve, as illustrated in FIG. 5, the pump 58 is connected to the reservoir 60 while both the output ports are blocked off. In one end position, the valve connects one of the output ports to the pump 58 and the other output port to the reservoir 60 while in the opposite end position these connections are reversed.

The hydraulic jack 32 has two working chambers 62 and 64. Because of the cross-sectional area of the rod 30, the piston 66 acts as a differential piston and the cross sectional areas of the two working chambers 62 and 64 are unequal. The working chamber 62 is connected by a pipe 70 to the connector 52 while the working chamber 64 is connected by a pipe 72 to the connector 54.

As so far described, the hydraulic circuit is conventional. In the illustrated embodiment of the invention there is an additional throttled passage 74 that connects the pipe 72 to the pipe 74, the throttle being formed by a hole having a diameter of about 1.5 mm.

Starting from the position shown in the drawing, the rod 30 is retracted by moving the valve 56 to the first end position in which the working chamber 64 is connected to the pump 58 and the larger working chamber is connected to the reservoir 60. In this position, fluid will also flow from the pump 58 to the reservoir 60 through the throttled passage 74 but the size of the throttle ensures that a sufficient pressure difference exists between the two working chambers to retract the rod 30 and rotate the rotor in the reverse direction.

To return the rod 30 to the park position, the valve 56 is moved to the other end position to connect the pump 58 to the larger working chamber 62 and the smaller working chamber 62 to the reservoir. Once again, there will be some leakage through the throttled passage 74 but despite this, the return movement will be more rapid, because it will not be opposed by the rotor, because it will be assisted by the spring 40 and because the higher pressure of the pump 58 will be acting on the larger face of the piston 66.

Let it now be assumed that the operator after having oscillated the valve between its two end positions to cause the rotor to reverse, inadvertently returns the valve to the central neutral position before the rod 30 is fully retracted, i.e. while the pawl 22 is still engaged in the teeth of the ratchet 12. In the prior art and in the absence of the throttled bypass passage 74, the rod would be hydraulically locked but in the illustrated embodiment of the invention, even with the working chambers 62 and 64 isolated by the valve 56 from the pump 58 and the reservoir 60, the rod is extended by the action of the spring 40. The force applied by the spring 40 is modified by the lever system 26 and 28 and increases as the rod 30 reaches the fully extended position.

During this movement of the piston, fluid displaced from the working chamber 64 is pumped through the passage 74 into the working chamber 62 and as the latter has the larger cross sectional area hydraulic lock cannot occur because the increase in the volume of the chamber 62 will always exceed the decrease in the volume of the working chamber 64. Any void that may appear in the chamber 62 as a result will contain a Torricellian vacuum but the force it generates is insignificant in comparison with the other forces acting on the rod 30.

It would be possible to design the hydraulic jack so as to have working chambers of equal cross sectional area but this increases the cost of the jack unnecessarily.

The invention claimed is:

1. A reversing mechanism for a rotor of a baler or of an in-feed system, comprising
    a ratchet mounted for rotation with the rotor,
    a pawl carried by a reversing arm for engaging the ratchet,
    a double acting hydraulic cylinder for reciprocating the reversing arm to cause the rotor to rotate in a reverse direction; and
    means for disengaging the pawl from the ratchet when the reversing arm is in a park position; and
    a park spring for urging the reversing arm towards the park position and working chambers of the double acting hydraulic cylinder are permanently in fluid communication to one another by way of a throttled passage.

2. A reversing mechanism as claimed in claim 1, wherein the hydraulic cylinder has a differential piston and the pressure acting on the larger face of the piston acts to move the reversing arm towards the park position.

3. A reversing mechanism as claimed in claim 1, wherein the reversing arm is mounted for rotation about the axis of the rotor and the pawl is pivotably mounted on the reversing arm in such a manner as to engage with the ratchet teeth under the action of a further spring, the pawl being pivoted against the action of the spring when it comes into a contact with a stationary abutment in the park position of the reversing arm.

4. A reversing mechanism as claimed in claim 1, wherein the park spring urging the reversing arm towards the park position acts on the reversing arm by way of a lever system configured to increase the spring force acting on the reversing arm as it approaches the park position.

5. A reversing mechanism as claimed in claim 4, wherein the lever system comprises a first lever rotatable at one end about an axis that is fixed in relation to the rotor axis and carrying at its opposite end a two-armed lever, one arm of the two-armed lever being connected to the reversing arm and the other to the park spring urging the reversing arm towards the park position, the opposite end of the latter spring being anchored to a point that is fixed relative to the axis of the rotor.

6. A reversing mechanism as claimed in claim 5, wherein the two-armed lever is a bell crank lever and the anchoring point of the park spring coincides with the pivot axis of the first lever.

7. A reversing mechanism for a rotor of a baler or of an in-feed system, comprising
    a ratchet mounted for rotation with the rotor;
    a pawl carried by a reversing arm for engaging the ratchet;
    a double acting hydraulic cylinder for reciprocating the reversing arm to cause the rotor to rotate in a reverse direction;
    means for disengaging the pawl from the ratchet when the reversing arm is in a park position; and
    a park spring for urging the reversing arm towards the park position and working chambers of the double acting hydraulic cylinder are permanently connected to one another by way of a throttled passage;
    the park spring urging the reversing arm towards the park position acts on the reversing arm by way of a lever system designed to increase the spring force acting on the reversing arm as it approaches the park position; and
    the lever system comprising a first lever rotatable at one end about an axis that is fixed in relation to the rotor axis and carrying at its opposite end a two-armed lever, one arm of the two-armed lever being connected to the reversing arm and the other to the park spring urging the reversing arm towards the park position, the opposite end of the latter spring being anchored to a point that is fixed relative to the axis of the rotor.

8. A reversing mechanism as claimed in claim 5, wherein the two-armed lever is a bell crank lever and the anchoring point of the park spring coincides with the pivot axis of the first lever.

* * * * *